(12) United States Patent
Broome-Webster

(10) Patent No.: US 6,371,757 B1
(45) Date of Patent: Apr. 16, 2002

(54) KILN FUEL SYSTEM

(76) Inventor: Fred L Broome-Webster, Checker Hall, St. Lucy (BB)

( * ) Notice: Subject to any disclaimer, the term of this patent is extended or adjusted under 35 U.S.C. 154(b) by 0 days.

(21) Appl. No.: 09/752,850

(22) Filed: Jan. 2, 2001

(51) Int. Cl.[7] .................................................. F27B 7/20
(52) U.S. Cl. ........................ 432/118; 432/105; 202/86
(58) Field of Search .......................... 432/20, 105, 108, 432/110, 118; 202/86; 110/246; 34/201

(56) References Cited

U.S. PATENT DOCUMENTS

| | | | |
|---|---|---|---|
| 3,595,544 A | | 7/1971 | Curtis |
| 4,047,884 A | * | 9/1977 | Heian .......................... 432/106 |
| 4,234,106 A | | 11/1980 | Rywak et al. |
| 4,887,958 A | * | 12/1989 | Hagar .......................... 431/12 |
| 5,040,972 A | * | 8/1991 | Kleinhenz et al. .......... 432/106 |
| 5,339,751 A | | 8/1994 | Tutt |
| 5,372,484 A | * | 12/1994 | Briggs et al. ................ 417/310 |
| 5,783,142 A | * | 7/1998 | Lindsay ....................... 266/145 |
| 5,806,442 A | | 9/1998 | Aldred et al. |
| 5,837,052 A | | 11/1998 | Oates et al. |

* cited by examiner

Primary Examiner—Gregory Wilson
(74) Attorney, Agent, or Firm—Michael I Kroll

(57) ABSTRACT

A kiln fuel system and method for producing cement. The system includes a tank for storing a fuel and a suction heater for drawing and preheating the fuel from the tank. A pressure station pressurizes the preheated fuel and a heater heats the preheated and pressurized fuel. A burner receives the fuel from the heater and ignites the fuel to form a flame and heat the concrete. The fuel is preferably a bitumen/water fuel mixture. A burner valve train is provided for regulating an amount and mixture of fuel and air supplied to the burner, preventing the flow of fuel to the burner upon detection of a predetermined condition, regulating an amount of heated and pressurized fuel supplied to the burner and providing a source of pressurized air for controlling a size of the flame produced by the burner. A slop tank is connected to the tank for receiving the fuel upon detecting a temperature of the fuel is above a predetermined value in the suction heater or above a predetermined pressure in the pressurizing station. A thermal heating device is connected to both the suction heater and heater for aiding in heating the fuel to a desired temperature, the thermal heating device includes a thermal oil supply and a thermal oil pump for providing the heated thermal oil supply to both the suction heater and heater. A filter is provided for screening the fuel prior to being pressurized.

24 Claims, 8 Drawing Sheets

KILN FUEL SYSTEM

BACKGROUND OF THE INVENTION

1. Field of the Invention

The present invention relates generally to kiln fuel systems and, more specifically, to a method and apparatus for storing, conveying and igniting a fuel consisting substantially of bitumen and water within a kiln.

2. Description of the Prior Art

Numerous types of fuel delivery systems designed for kilns have been provided in the prior art. For example, U.S. Pat. Nos. 3,595,544; 4,234,106; 5,339,75 1; 5,806,442 and 5,837,052 all are illustrative of such prior art. While these units may be suitable for the particular purpose to which they address, they would not be as suitable for the purposes of the present invention as heretofore described.

U.S. Pat. No. 3,595,544

Inventor: George T. Curtis

Issued: Jul. 27, 1971

This invention relates to the combination of a rotary kiln for sintering raw material into sinter having drive means connected to the rotary kiln for rotating the rotary kiln, heating means disposed adjacent one end of the rotary kiln for directing a heated fluid through the rotary kiln to sinter the raw material as the new raw material passes through the rotary kiln from the other end of the rotary kiln to the one end of the rotary kiln, and control means associated with the rotary kiln for controlling the operation of one of the drive means and the heating means.

U.S. Pat. No. 4,234,106

Inventor: Donald E. Rywak et al.

Issued: Nov. 18, 1980

A series of operatively interconnected fuel flow regulators are adapted to meter and direct the flow of particulate fuel from a fuel conveying system into the burners of a furnace or kiln. Each regulator is fed by a conveying system and includes a feeder housing having a flow metering impeller and feed rotor arrangement. Each housing includes an adjustable fuel orifice communicating with a respective burner.

U.S. Pat. No. 5,339,751

Inventor: James R. Tutt

Issued: Aug. 23, 1994

A firing system is provided for charging a plurality of incoming combustible fuel modules containing a known amount of a parameter of interest into a heated zone of a rotating kiln. The firing system separates incoming fuel modules into a plurality of stages based on the parameter amount in each fuel module. The system then removes fuel modules from the plurality of stages in a selected order to maintain an average parameter amount for fuel modules charged into the kiln at substantially a preselected level. The system charges fuel modules into the kiln in the selected order. The system determines an optimum time to charge each fuel module into the rotating kiln to maintain an average amount of the parameter of interest supplied to the kiln substantially at the preselected level.

U.S. Pat. No. 5,806,442

Inventor: Ernie Aldred et al.

Issued: Sep. 15, 1998

A feeding apparatus for feeding whole tires into a cement kiln comprising a feed opening in the shell of the kiln, a passageway including a sleeve extending within and outside the kiln, an arcuate sector valve device for closing the passageway and timed to open so as to allow the tires to fall into the kiln through the passageway. The sector valve having an outer perforated wall and an inner wall, the perforated wall allowing ambient air to circulate between the outer and inner wall to keep the outer wall cool for contact with the tires. A transfer device is provided for transferring the tires onto the feeding apparatus wherein the transfer device includes fingers while the feeding apparatus includes a fork receiving tray interdigitated with the fingers to pick up the tires as the kiln rotates.

U.S. Pat. No. 5.837,052

Inventor: David Bridson Oates

Issued: Nov. 17, 1998

Contaminated coal ash, for example flyash contaminated with carbon is introduced to hot clinker in a cooler downstream of a cement kiln; the carbon is combusted in the cooler to provide a cement clinker having an effective content of flyash free of carbon; this permits use of flyash contaminated with carbon without the need for separate special steps for carbon removal; volatile contaminants of contaminants having a volatile component, for example absorbed ammonia are similarly removed in the cooler by volatilization.

SUMMARY OF THE PRESENT INVENTION

The present invention relates generally to kiln fuel systems and, more specifically, to a method and apparatus for storing, conveying and igniting a fuel consisting substantially of bitumen and water within a kiln.

A primary object of the present invention is to provide a kiln fuel system that will overcome the shortcomings of prior art devices.

A further object of the present invention is to provide a kiln fuel system which is able to use a mixture consisting substantially of bitumen and water as a kiln fuel as an economically viable substitute for conventionally used fuel oil.

Another object of the present invention is to provide a kiln fuel system having a bottom fill storage tank or tanks to eliminate foaming of the bitumen/water fuel mixture.

A yet further object of the present invention is to provide a kiln fuel system able to preheat the fuel to a desired selectable temperature.

A still further object of the present invention is to provide a kiln fuel system able to pressurize the fuel to a desired pressure for delivery.

An even further object of present invention is to provide a kiln fuel system able to heat the pressurized fuel to as desired selectable temperature.

Yet another object of the invention is to provide a kiln fuel system able to vary the length and shape of the flame produced within the kiln.

Yet another object of the present invention is to provide a kiln fuel system using a bitumen and water fuel having physical, chemical and combustion characteristics which have little impact on the final quality of the cement produced by a dry process.

Still yet another object of the present invention is to provide a kiln fuel system having emission characteristics below those required by International Environmental and Safety Regulations.

Another object of the present invention is to provide a kiln fuel system that is simple and easy to use.

A still further object of the present invention is to provide a kiln fuel system that is economical in cost to manufacture.

Additional objects of the present invention will appear as the description proceeds.

The bitumen/water fuel mixture of the present invention is stored at ambient temperature in bottom filled fuel tank. Alternatively, a plurality of bottom filled fuel tanks may be used. The fuel is extracted from the tank by a suction heater, the suction heater preheating the fuel using an indirect heat exchanger with thermal oil as the heat medium. The pre heating selectively raises the temperature of the fuel to substantially 40° C. before carrying the fuel to a high pressure pump station. The high pressure pump station increases the fuel pressure to be atomized by the burner. After pressurizing, the fuel is fed via a conduit to a high pressure heater station. The temperature of the fuel is increased in the high pressure heater station to substantially 70° C. by one or more indirect heat exchangers using thermal oil as the heat medium. The pressurized and heated fuel is fed through another conduit to the burner valve train in which it is filtered. The burner valve train is comprised of a plurality of pressure gauges, regulating valves, check valves, a quick shut off switch and mass flow meter for monitoring and adjusting the flame within the kiln.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
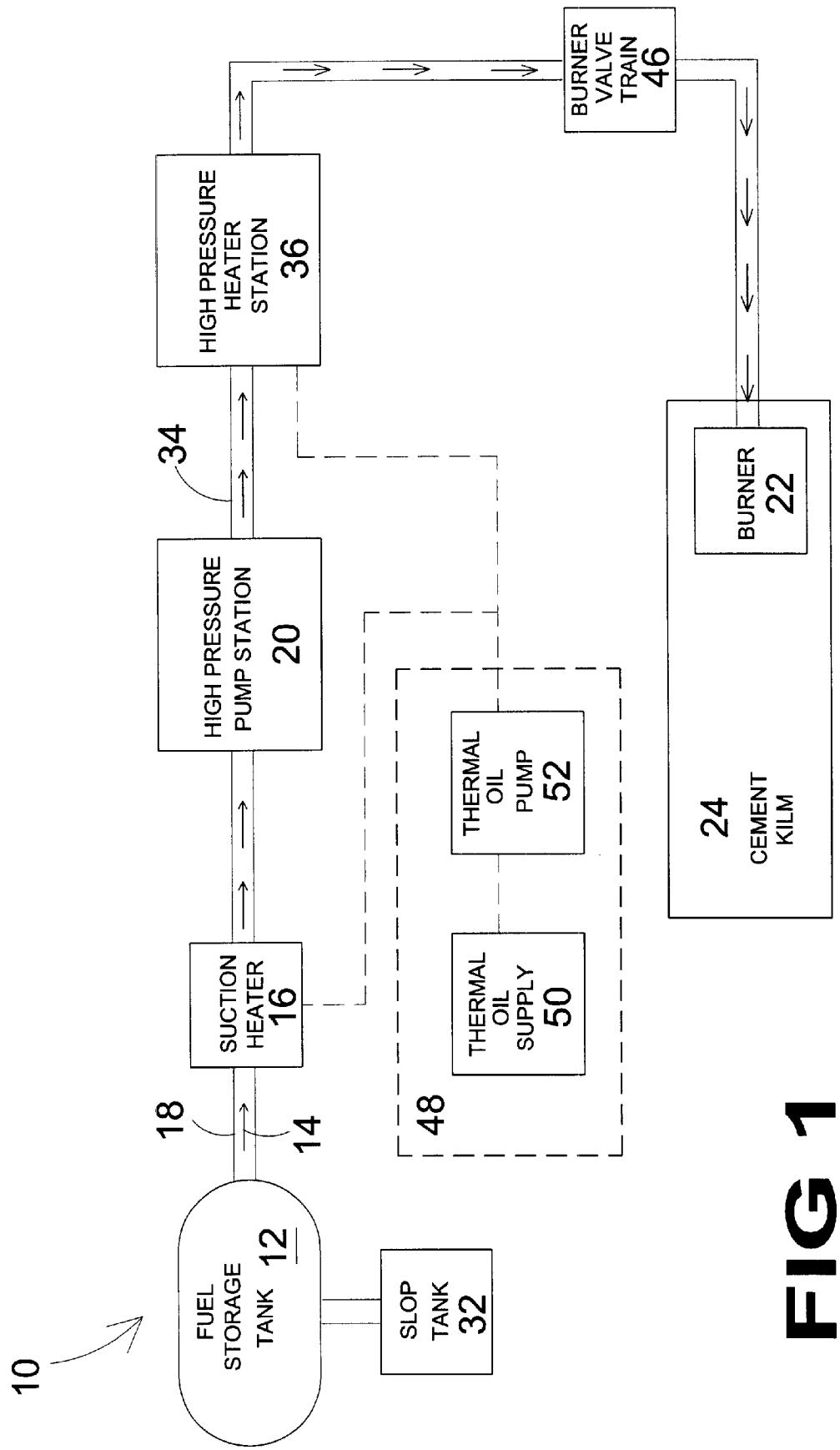
FIG. 1 is a block diagram of the kiln fuel system of the present invention.

Turning now descriptively to the drawings, in which similar reference characters denote similar elements throughout the several views, the Figures illustrate the kiln fuel system of the present invention. With regard to the reference numerals used, the following numbering is used throughout the various drawing figures.

10 kiln fuel system of the present invention
12 bottom filled fuel tank
14 bitumen/water fuel mixture
16 suction heater
18 conduit between tank and high pressure pump station
20 high pressure pump station
22 burner
24 kiln
26 filters of high-pressure pump station
28 pump of high-pressure pump station
30 safety valves of high-pressure pump station
32 slop tank
34 conduit between high pressure pump station and high pressure heater station
36 high pressure heater station
38 safety valves in high pressure heater station
40 high pressure heater in high pressure heater station
42 temperature controlled flow valve in high pressure heater station
44 fuel line thermostat in high pressure heater station
46 burner train valve
48 indirect heat exchanger
50 thermal oil supply
52 thermal oil pump
54 thermostat
56 second 3-way temperature control valve
58 temperature control valve
60 pumps
62 valve shut-off switches 64 return line
66 conduit from temperature control valve to high pressure heater station
68 quick shut off switch
70 mass flow meter
72 regulating and check valves
74 pressurized air intake
76 conduit between burner valve train and burner

DETAILED DESCRIPTION OF THE PREFERRED EMBODIMENT

Turning now descriptively to the drawings, in which similar reference characters denote similar elements throughout the several views, FIGS. 1 through 8 illustrate the kiln fuel system of the present invention indicated generally by the numeral 10.

A block diagram of the kiln fuel system 10 is shown in FIG. 1. The kiln fuel system 10 includes a bottom filled fuel tank 12 for storing a bitumen/water fuel mixture. Alternatively, any number of bottom filled fuel tanks 12 may be connected to the system 10 for supplying the bitumen/water fuel mixture. The bitumen/water fuel mixture is indicated by the arrows labeled with the numeral 14 which show the path followed by the bitumen/water fuel mixture 14 through the kiln fuel system 10. The bitumen/water fuel mixture 14 is stored at ambient temperature in the bottom filled fuel tank 12. The tank 12 is designed to prevent foaming of the bitumen/water fuel mixture 14. The bitumen/water fuel mixture 14 is extracted from the tank 12 by a suction heater 16. The bitumen/water fuel mixture 14 passes from the tank 12 to the suction heater 16 through a conduit 18. The suction heater 16 preheats the bitumen/water fuel mixture 14 to a temperature of substantially 40° C. The heating of the bitumen/water fuel mixture 14 is performed by an indirect heat exchanger 48 using thermal oil as a heat medium. The indirect heat exchanger 48 includes a thermal oil supply 50 and a thermal oil pump 52. The pre heating of the bitumen/water fuel mixture 14 accelerates the flow rate from the storage tank 12 to a high pressure pump station 20.

Figure 2:
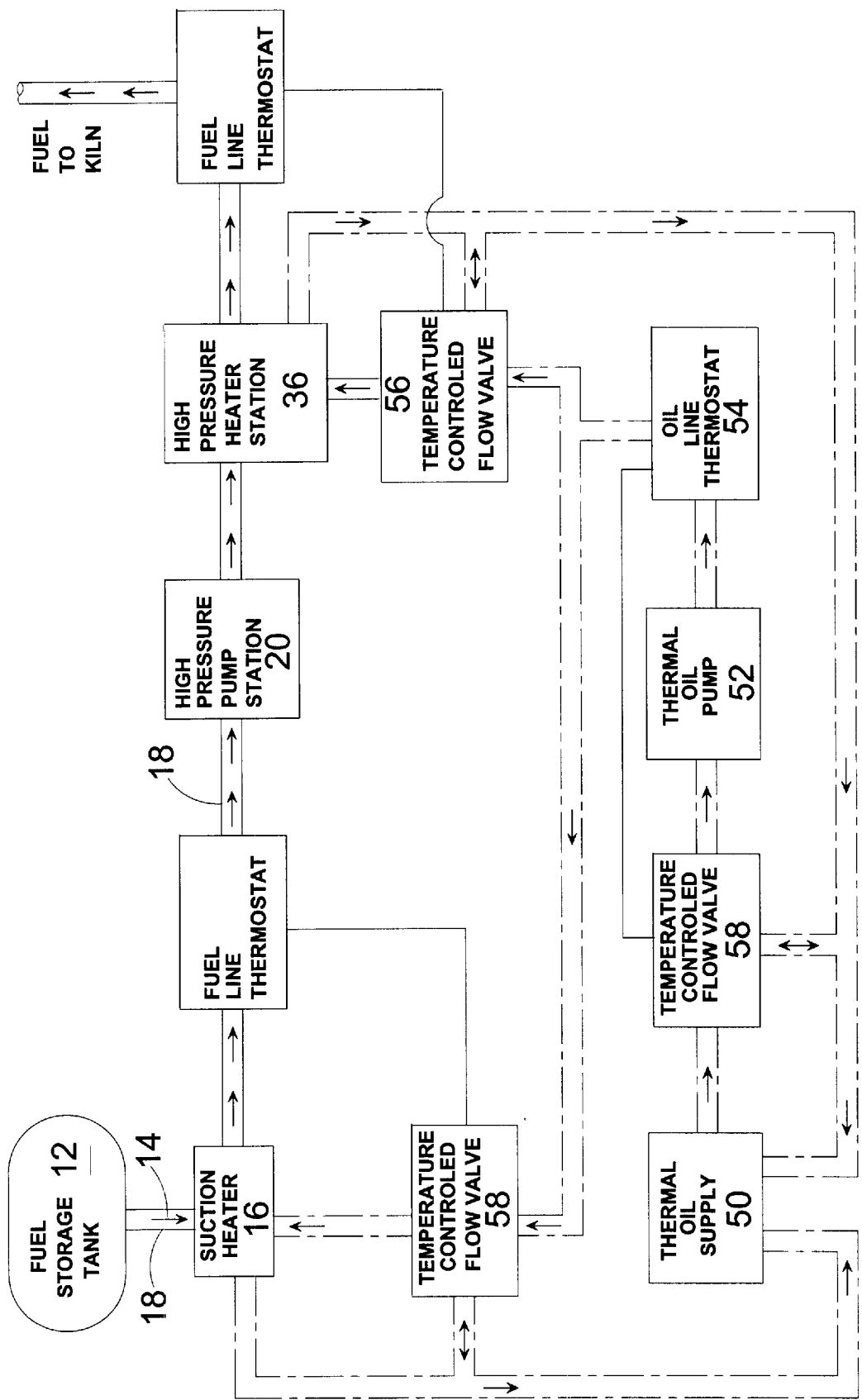
FIG. 2 is a block diagram of the kiln fuel system of the present invention illustrating a device for controlling the fuel temperature through conduction using thermal oil as the heat medium.

The preheated bitumen/water fuel mixture 14 is carried through the conduit 18 to the high pressure pump station 20. The temperature of the bitumen/water fuel mixture 14 within the conduit 18 is able to be selectively controlled and regulated with a temperature control valve 22 and a thermostat 24 as shown in FIG. 2. The temperature control valve 22 forms a portion of a thermal oil valve station. The thermostat 24 and temperature control valve 22 automatically control the temperature of the bitumen/water fuel mixture 14 being delivered to the high pressure pump station 20.

As can be seen in FIG. 2 the supply of thermal oil 50 is conducted to the suction heater 16 through a closed loop system by the thermal oil pump 52. The temperature of the oil is continuously regulated by a thermostat 54 communicating with the first 3-way temperature control valve 22 and a second 3-way temperature control valve 56 able to mix or divert the thermal oil from and to the conduit 18. The thermal oil of a selected temperature is divergently conducted to the suction heater 16 and to a high pressure heater 36 having a respective return conduit. The bitumen/water fuel mixture 14 is also conducted through the suction heater 16 where, by conduction through the thermal oil conduit, the temperature is selectively raised. The selective temperature is controlled by the thermostat 54 communicating with the first 3-way temperature control valve 22. The first 3-way temperature control valve 22 mixes or diverts the thermal oil through the suction heater 16.

Figure 3:
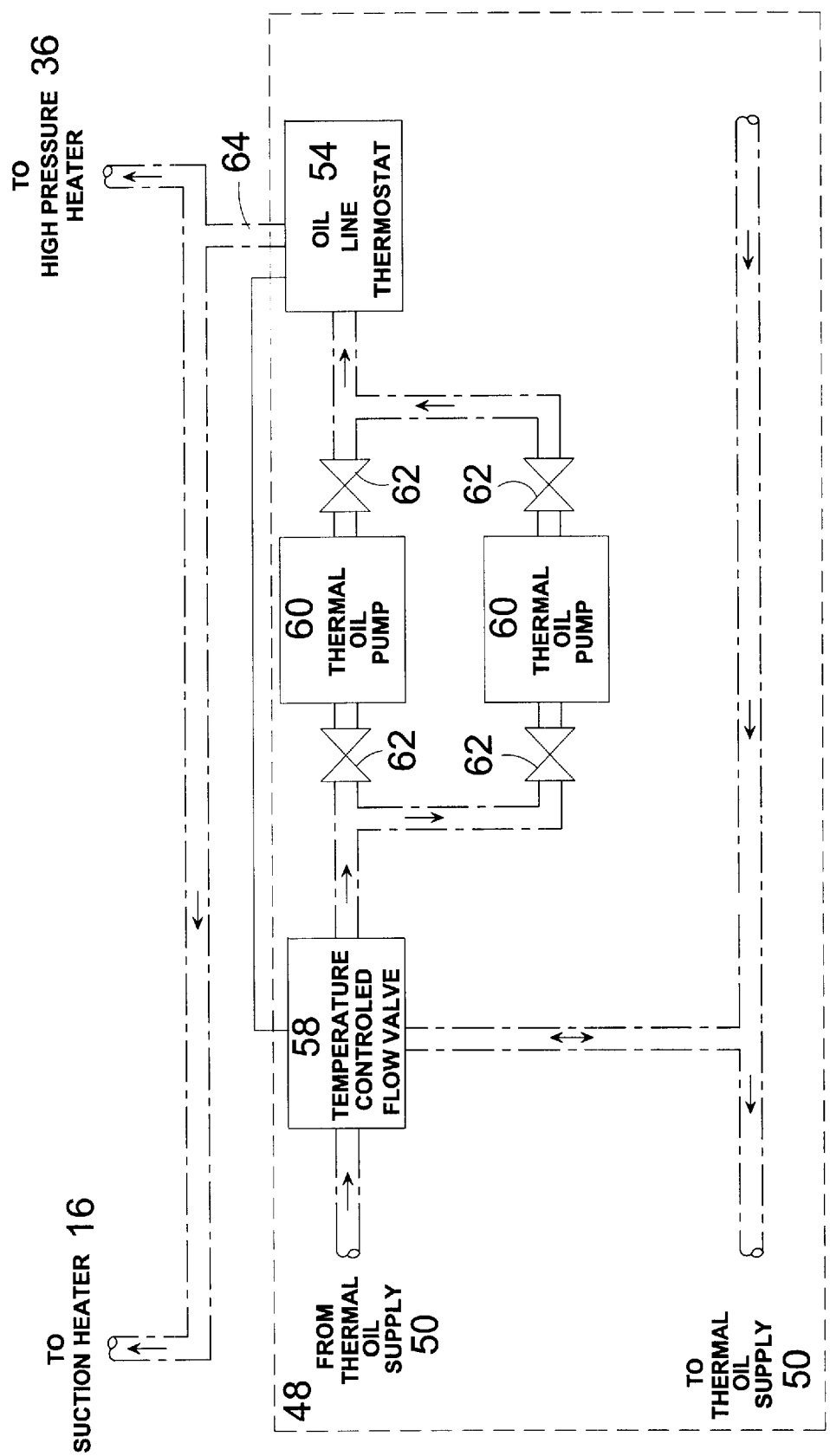
FIG. 3 is a block diagram of the thermal oil pumping station used in the kiln fuel system of the present invention.

FIG. 3 shows the conduction of thermal oil from the thermal oil supply 50 to the oil line thermostat 54 back to both the suction heater 16 and high pressure heater station 36. The thermal oil is conducted from the thermal oil supply 50 through a temperature control valve 58 by one or more pumps 60. The temperature of the thermal oil is selectively controlled through the thermostat 54 communicating with the temperature control valve 58. The temperature control valve 58 is able to mix or divert the thermal oil from or to the return line 64. The return line 64 provides the thermal oil from the thermostat 54 to either the suction heater 16 or the high pressure heater station 36. The thermal oil pumping station 48 can have a redundant pumping device including valve shutoff switches 62 whereby a pump 60 can be removed from service without shutting down the system.

Figure 4:
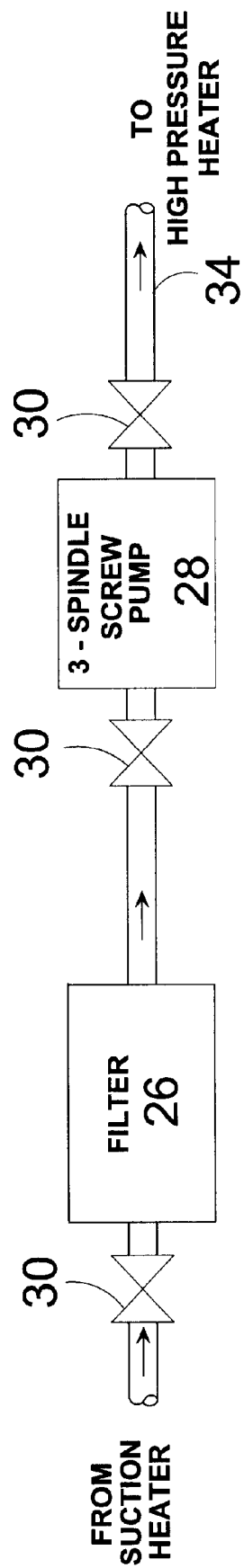
FIG. 4 is a block diagram of the high pressure pump station having a three spindle pump used in the kiln fuel system of the present invention for reducing shear on the fuel.
Figure 5:
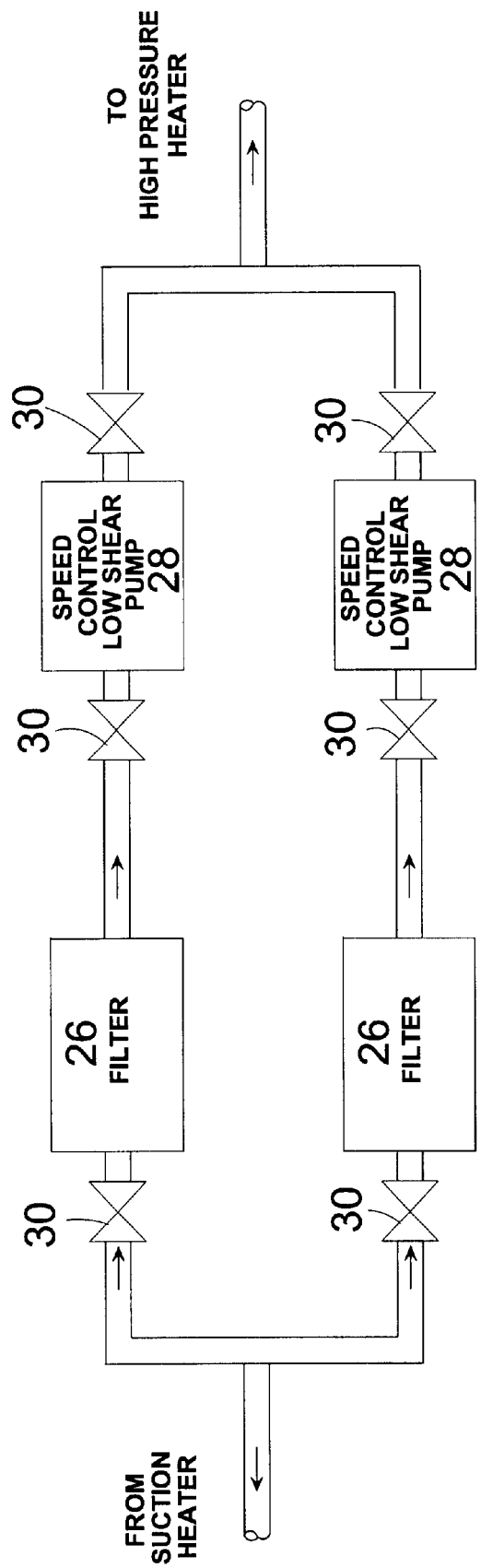
FIG. 5 is a block diagram of the high pressure pump station having additional elements used in the kiln fuel system of the present invention.

The bitumen/water fuel mixture 14 which is preheated in the suction heater 16 is fed through the conduit 18 and into the high pressure pump station 20 which sufficiently increases the pressure of the bitumen/water fuel mixture 14 which is to be atomized by a burner 22 within the kiln 24. The high pressure pump station 20 is comprised of one or more systems having filters 26 for screening unwanted particle matter suspended in the fuel 14 and a pump 28 for increasing the pressure to a predetermined amount as is shown in FIG. 4. A three spindle pump is preferably used to reduce shear on the fuel. The high-pressure pump station 20 is also equipped with safety valves 30. If it is determined that the pressure of the bitumen/water fuel mixture 14 within the high pressure pump station 20 exceeds the predetermined amount, the bitumen/water fuel mixture 14 within the tank 12 is directed to a slop tank 32. In addition, a plurality of valves providing easy access to components of the system for servicing and, with regards to the use of redundant systems, the valves provide access for servicing system components without shutting down the entire system 10. A redundant system is illustrated in FIG. 5 wherein a desired pump 60 can be removed from service without shutting down the system by shutting a particular combination of switches 30.

Figure 6:
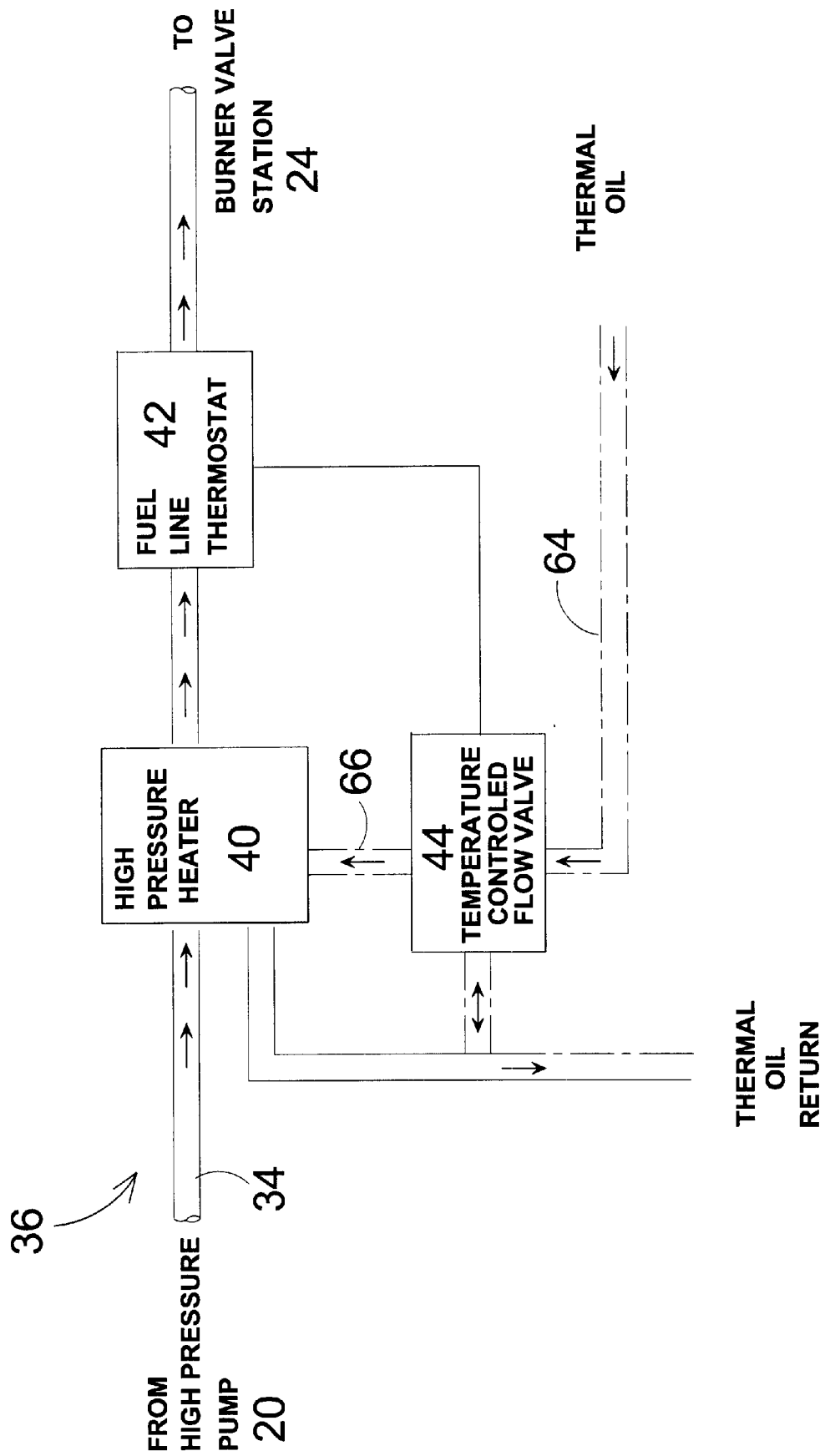
FIG. 6 is a block diagram of the high pressure heater station used in the kiln fuel system of the present invention for providing control of the pressurized fuel temperature through conduction using thermal oil as the heat medium.
Figure 7:
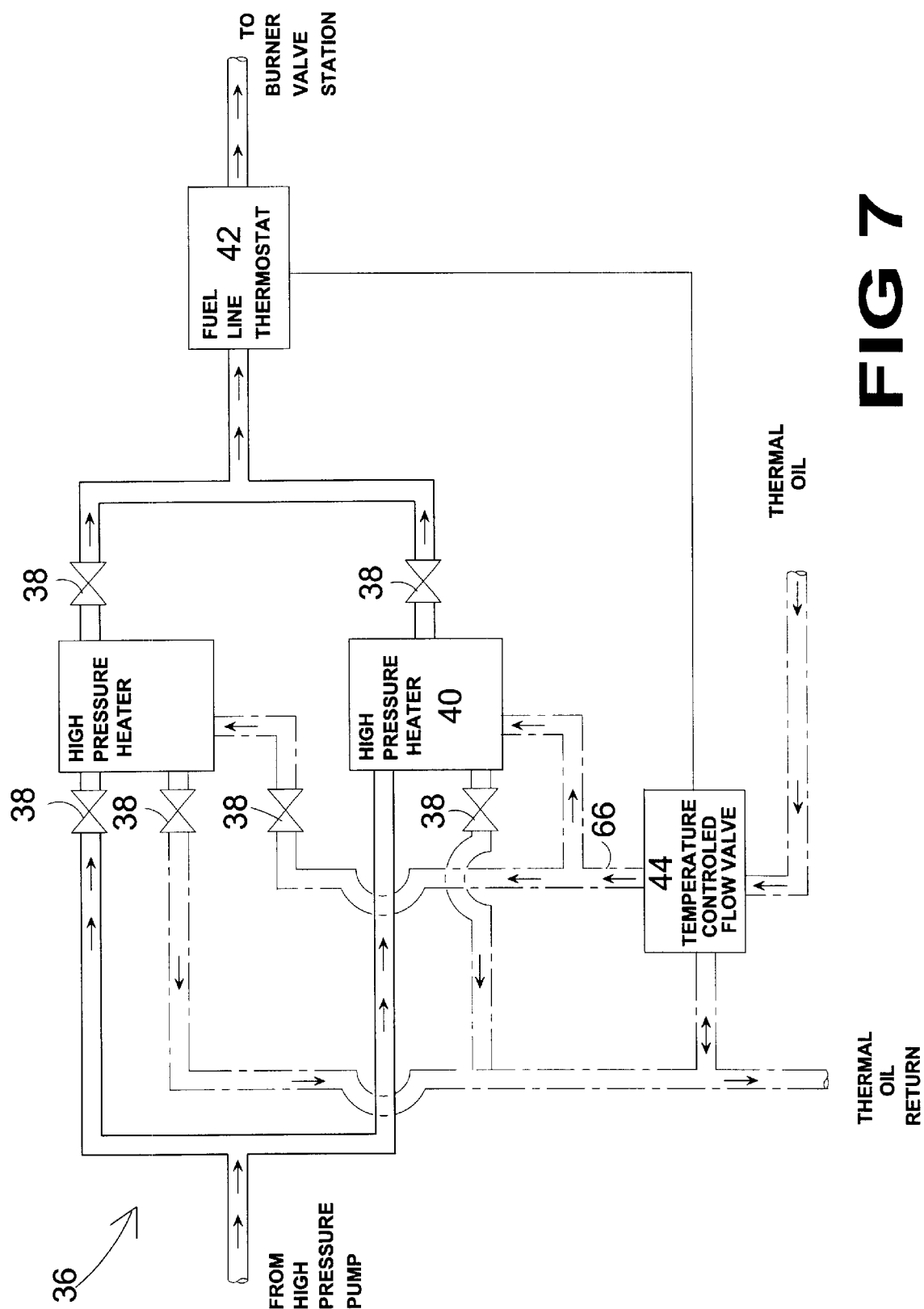
FIG. 7 is a block diagram of the high pressure heater station used in the kiln fuel system of the present invention having additional elements.

After being pressurized in the high pressure pump station 20, the bitumen/water fuel mixture 14 is fed via a conduit 34 to the high pressure heater station 36. The high pressure heater station 36 includes a high pressure heater 40 for increasing the temperature of the bitumen/water fuel mixture 14 to approximately 70° C. using one or more indirect heat exchangers and thermal oil as a heat medium as is shown in FIGS. 2, 6 and 7. The high pressure heater station 36 is equipped with either a high pressure heater 40 and a fuel line thermostat 42 as shown in FIG. 6 or a plurality of high pressure heaters 40 and a plurality of safety valves 38 connected to the fuel line thermostat 42 as shown in FIG. 7. The redundant system illustrated in FIG. 7 allows a desired pump 40 to be removed from service without shutting down the system. This is performed by shutting a combination of the switches 38. If it is determined that the pressure of the bitumen/water fuel mixture 14 within the high pressure heater section 36 exceeds a predetermined value the bitumen/water fuel mixture 14 within the tank 12 is directed to the slop tank 32. In addition, a plurality of valves are provided for facilitating servicing of components of the system 10. With regards to the use of multiple heat exchangers, the valves allow for servicing system components without shutting down the entire system.

The thermal oil of a selected temperature is divergently conducted to the high pressure heater 36 having a respective return conduit as is illustrated in FIG. 2. As is shown in FIG. 6, the bitumen/water fuel mixture 14 is also further conducted through the high pressure heater station 36 where, by conduction through the thermal oil conduit, the temperature is selectively raised. The selective temperature is controlled by the thermostat 54 communicating with the second 3-way temperature control valve 56. The second 3-way temperature control valve 56 is able to mix or divert the thermal oil through the high pressure heater 36.

The use of redundant high pressure heaters 40 is shown in FIG. 7. These redundant high pressure heaters 40 provide control of the pressurized fuel temperature through conduction using thermal oil as the heat medium. The supply of thermal oil is conducted through a temperature control valve 44 to the high pressure heaters 40. The bitumen/water fuel mixture 14 is also conducted through the high pressure heaters 40 whereby, during conduction through the thermal oil conduit, the temperature is selectively raised. The selective temperature is controlled by the thermostat 42 communicating with the 3-way temperature control valve 44 which is able to mix or divert thermal oil through the high pressure heaters 40. The use of the redundant high pressure heaters 40 allows for servicing components of the system 10 without shutting down the entire system. Furthermore, the high-pressure heaters 40 are equipped with pressure safety valves 38 where if the pressure exceeds a predetermined amount the fuel is directed from the tank 12 to the slop tank 32.

A conduit 66 including a temperature control valve 44 connects the thermal oil valve station for selectively controlling the temperature of the bitumen/water fuel mixture 14 and thereby regulating the heat medium through the high pressure heater station 36. Thereby, the thermostat 42 and temperature control valve 44 automatically regulate the temperature of the bitumen/water fuel mixture 14 being delivered to a burner operating valve train 46 located downstream from the high pressure heater station 36.

Figure 8:
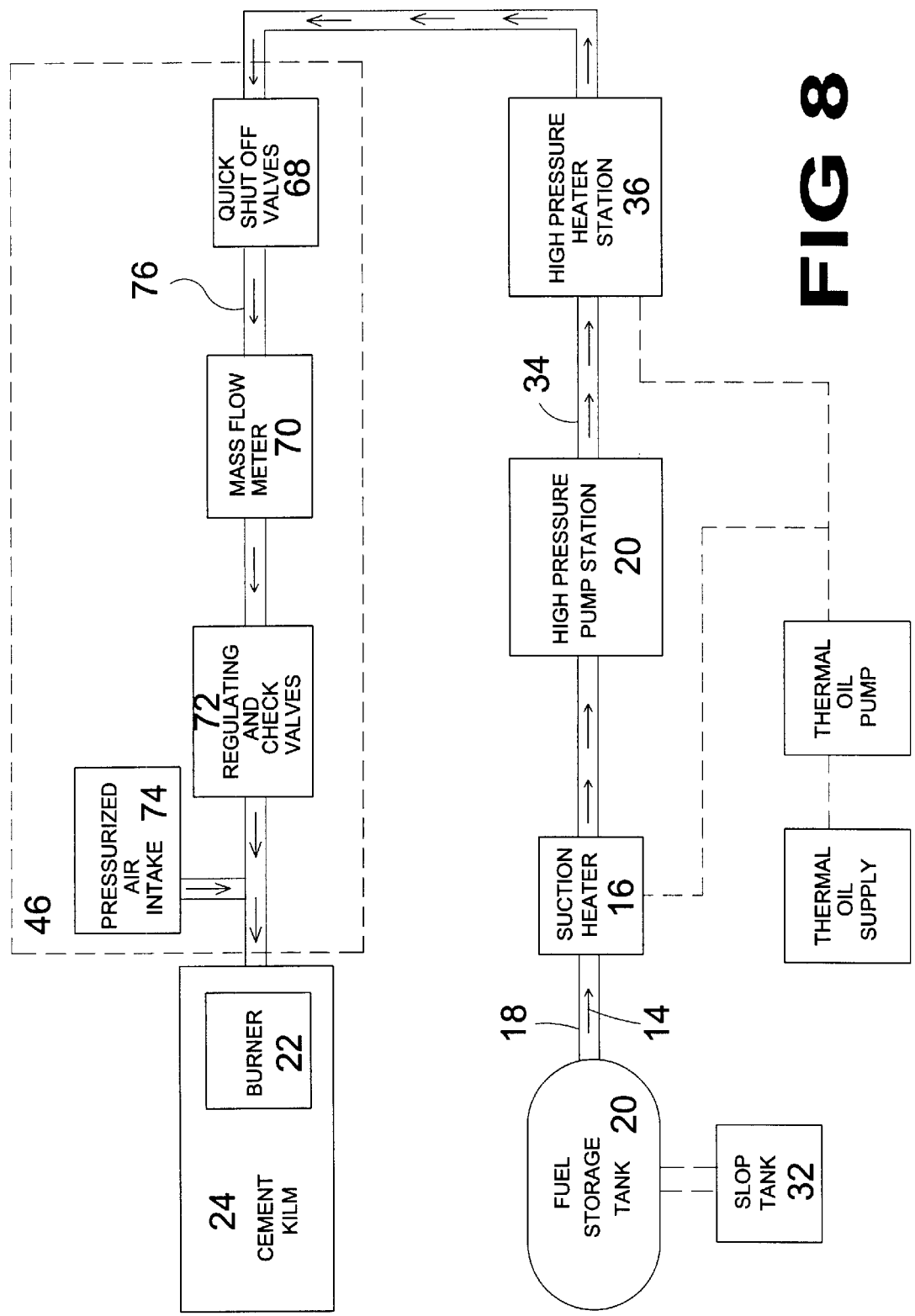
FIG. 8 is a block diagram of the burner valve train used in the kiln fuel system of the present invention.

The pressurized heated fuel is fed via a conduit 76 into the burner valve train 46 where it is screened. The burner valve train 46 is comprised of a plurality of quick shut off switch 68, a mass flow meter 70, regulating and check valves 72 and a pressurized air intake 74 as shown in FIG. 8. In addition the conduit 76 is equipped with an electrical trace heating cable and an electrical temperature controller to keep the temperature below 80° C. The quick shut-off valves 68 close the conduit 76 if a safety signal from the burner control 22 is missing and the regulating and check valves 72 control the flow in the axial and radial flow lines. The exact required fuel consumption and the flame shape can be set using these valves. The fuel is conducted through the burner valve train and the conduit 76 to the burner 22. The burner valve train 46 serves as the control center for monitoring the performance of the fuel system, providing means for controlling such variables as the amount and mixture of fuel and air, and providing safety shut-off valves which close if any safety signal from the burner is missing. The mass flow meter indicates the flow of the bitumen/water mixture to the burner. The fine regulating valves 72 regulate the amount of heated and pressurized fuel supplied to the burner 22 and the air intake with pressure control switches 74 provide a source of pressurized air for controlling the flame size of the burner 22 within the kiln 24.

The operation of the kiln fuel system 10 will now be described with reference to the figures. In operation, the kiln fuel system 10 is set up for producing cement using a dry process having a particular quality with a bitumen/water fuel mixture. The bitumen/water fuel mixture has physical, chemical and combustion characteristics which have little impact on the final quality of the cement produced. The system stores the bitumen/water fuel mixture in a fuel storage tank 20 until the fuel is needed.

Upon initiation of the process, the bitumen/water fuel mixture 14 is drawn from the tank 12 and through a conduit 18 by a suction heater 16. The bitumen/water fuel mixture 14 is preheated to a temperature of preferably substantially 40° C. by an indirect heat exchanger 48 including a thermal oil supply 50 and a thermal oil pump 52. The pre heating of the bitumen/water fuel mixture 14 accelerates the flow rate from the storage tank 12 to a high pressure pump station 20. The thermal oil is conducted from the thermal oil supply 50 through a temperature control valve 58 by one or more pumps 60. The temperature of the thermal oil is selectively controlled through the thermostat 54 communicating with the temperature control valve 58. The temperature control valve 58 is able to mix or divert the thermal oil from or to the return line 64. The return line 64 provides the thermal oil from the thermostat 54 to either the suction heater 16. The thermal oil of a selected temperature is divergently conducted to the suction heater 16. The bitumen/water fuel mixture 14 is also conducted through the suction heater 16 where, by conduction through the thermal oil conduit, the temperature of the bitumen/water fuel mixture 14 is selectively raised. The selective temperature is controlled by the thermostat 54 communicating with the first 3-way temperature control valve 22. The first 3-way temperature control valve 22 mixes or diverts the thermal oil through the suction heater 16.

The preheated bitumen/water fuel mixture 14 is then passed to the high pressure pump station 20 which pressurizes the bitumen/water fuel mixture 14. The high pressure pump station 20 screening unwanted particle matter suspended in the bitumen/water fuel mixture 14 through filters 26 and increases the pressure to a predetermined amount using a pump 60. A three spindle pump is preferably used to reduce shear on the bitumen/water fuel mixture 14. Safety valves 30 within the high pressure pump station 20 allow a desired pump 60 can be removed from service without turning off the entire system. If it is determined that the pressure of the bitumen/water fuel mixture 14 within the high pressure pump station 20 exceeds the predetermined amount, the bitumen/water fuel mixture 14 within the tank 12 is directed to a slop tank 32.

The preheated and pressurized bitumen/water fuel mixture 14 is then provided to the high pressure heater station to be further heated to preferably a temperature of substantially 70° C. The high pressure heater station 36 uses the indirect heat exchanger 48 used by the suction heater 16 to further heat the preheated and pressurized bitumen/water fuel mixture 14. The bitumen/water fuel mixture 14 is then supplied to the burner valve train 46 and then to the burner 22. The burner valve train 46 serves as the control center for monitoring the performance of the fuel system, controlling such variables as the amount and mixture of fuel and air, and providing safety shut-off valves 68 which close if any safety signal from the burner is missing. The mass flow meter 70 indicates the flow of the bitumen/water mixture to the burner 22. The fine regulating valves 72 regulate the amount of heated and pressurized fuel supplied to the burner 22 and the air intake with pressure control switches 74 provide a source of pressurized air for controlling the flame size of the burner 22 within the kiln 24. The burner valve train 46 is thus able to control the length and shape of the flame produced within the kiln 24. The bitumen and water fuel also has physical, chemical and combustion characteristics which have little impact on the final quality of the cement produced by a dry process and has emission characteristics below those required by International Environmental and Safety Regulations.

From the above description it can be seen that the kiln fuel system of the present invention is able to overcome the shortcomings of prior art devices by providing a kiln fuel system which is able to use a mixture consisting substantially of bitumen and water as a kiln fuel as an economically viable substitute for conventionally used fuel oil. The kiln fuel system includes a bottom fill storage tank or tanks to eliminate foaming of the bitumen/water fuel mixture. The kiln fuel system able to preheat the fuel to a desired selectable temperature, pressurize the fuel to a desired pressure and further heat the pressurized fuel to as desired selectable temperature. The kiln fuel system is also able to vary the length and shape of the flame produced within the kiln. The kiln fuel system uses a bitumen and water fuel having physical, chemical and combustion characteristics which have little impact on the final quality of the cement produced by a dry process and has emission characteristics below those required by International Environmental and Safety Regulations. Furthermore, the kiln fuel system of the present invention is simple and easy to use and economical in cost to manufacture.

It will be understood that each of the elements described above, or two or more together may also find a useful application in other types of methods differing from the type described above.

While certain novel features of the invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A kiln fuel system comprising:
   a) means for storing a fuel;
   b) suction means for drawing the fuel from said storing means and preheating said fuel;
   c) means for pressurizing the preheated fuel;
   d) means for heating the preheated and pressurized fuel;
   e) burner means for receiving the fuel from the heating means and igniting the fuel to form a flame for heating the cement.

2. The kiln fuel system as recited in claim 1, wherein said fuel is a bitumen/water fuel mixture.

3. The kiln fuel system as recited in claim 1, further comprising means for regulating an amount and mixture of fuel and air supplied to said burner means.

4. The kiln fuel system as recited in claim 3, wherein said regulating means further includes a shut-off valve preventing the flow of fuel to said burner means upon detection of a predetermined condition.

5. The kiln fuel system as recited in claim 4, wherein said regulating means further includes a fine regulating valve for regulating an amount of heated and pressurized fuel supplied to said burner means.

6. The kiln fuel system as recited in claim 5, wherein said regulating means further includes pressure control switches for providing a source of pressurized air for controlling a size of the flame produced by said burner means.

7. The kiln fuel system as recited in claim 1, further comprising a slop tank connected to said tank for receiving the fuel upon detecting a temperature of said fuel is above a predetermined value in said suction means or above a predetermined pressure in said pressurizing means.

8. The kiln fuel system as recited in claim 1, further comprising thermal heating means connected to both said suction means and said heating means for aiding in heating the fuel to a desired temperature.

9. The kiln fuel system as recited in claim 8, wherein said thermal heating means includes a thermal oil supply and a thermal oil pump for providing said heated thermal oil supply to both said suction means and said heating means.

10. The kiln fuel system as recited in claim 1, wherein said pressurizing means includes a plurality of pumps and a plurality of switches, each of said plurality of pumps being connected between said suction means and said heating means and each switch being connected between a respective one of said pumps and one of said suction means and said heating means for individually connecting and disconnecting said respective pump from said system.

11. The kiln fuel system as recited in claim 1, wherein said heating means includes a plurality of heaters and a plurality of switches, each of said plurality of heaters being connected between said pressurizing means and said burner means and each switch being connected between a respective one of said heaters and one of said pressurizing means and said burner means for individually connecting and disconnecting said respective heater from said system.

12. The kiln fuel system as recited in claim 1, wherein said pressurizing means further includes filter means for screening the fuel being pressurized thereby.

13. The kiln fuel system as recited in claim 8, further comprising a thermostat connected between said thermal heating means and both said suction means and heating means for regulating a temperature of the fuel being heated thereby.

14. The kiln fuel system as recited in claim 1, further comprising a thermostat connected between said heating means and said burner means for regulating a temperature of the fuel being heated by said heating means.

15. A method of forming cement, said method comprising the steps of:
   a) storing a fuel in a tank;
   b) drawing the fuel mixture from the tank and preheating the fuel;
   c) pressurizing the preheated fuel;
   d) heating the preheated pressurized fuel;
   e) igniting the fuel mixture by a burner to form a flame for heating the cement.

16. The method as recited in claim 15, wherein said fuel is a bitumen/water fuel mixture.

17. The method as recited in claim 15, further comprising the step of regulating an amount and mixture of fuel and air supplied to the burner for controlling a size of the flame produced.

18. The method as recited in claim 17, further comprising the step of preventing the flow of fuel to the burner upon detection of a predetermined condition.

19. The method as recited in claim 18, further comprising the step of regulating an amount of heated and pressurized fuel supplied to the burner.

20. The method as recited in claim 19, further comprising the step of providing a source of pressurized air to the burner for controlling a size of the flame produced thereby.

21. The method as recited in claim 15, further comprising the step of providing the fuel in the tank to a slop tank upon detecting a temperature of said fuel is above a predetermined value or above a predetermined pressure.

22. The method as recited in claim 15, further comprising the step of providing a heated thermal oil supply for aiding in heating the fuel to a desired temperature.

23. The method as recited in claim 15, further comprising the step of screening the fuel prior to pressurization.

24. The method as recited in claim 15, further comprising the step of regulating a temperature of the fuel being heated thereby.

* * * * *